United States Patent [19]

Cheung et al.

[11] Patent Number: 5,872,201
[45] Date of Patent: Feb. 16, 1999

[54] INTERPOLYMERS OF ETHYLENE, OLEFINIC MONOMERS, AND AROMATIC VINYLIDENE OR HINDERED ALIPHATIC OR CYCLOALIPHATIC VINYLIDENE MONOMERS

[75] Inventors: Yunwa W. Cheung; Martin J. Guest, both of Lake Jackson, Tex.; Francis J. Timmers, Midland; Stephen F. Hahn, Sanford, both of Mich.

[73] Assignee: The Dow Chemical Company, Midland, Mich.

[21] Appl. No.: 796,849

[22] Filed: Feb. 6, 1997

Related U.S. Application Data

[63] Continuation-in-part of Ser. No. 469,828, Jun. 6, 1995, Pat. No. 5,703,187, which is a continuation of Ser. No. 545,403, Jul. 3, 1990, which is a continuation-in-part of Ser. No. 401,345, Aug. 31, 1989, abandoned.

[51] Int. Cl.$^6$ .................................................. C08F 212/08
[52] U.S. Cl. ......................... 526/282; 526/280; 526/281; 526/346; 526/347; 526/347.1; 526/348.1; 526/348.2; 526/348.3; 526/348.4; 526/348.5; 526/348.6
[58] Field of Search .................................... 526/280, 281, 526/282, 346, 347, 347.1, 348.1, 348.2, 348.3, 348.4, 348.5, 348.6

[56] References Cited

U.S. PATENT DOCUMENTS

| | | | |
|---|---|---|---|
| 4,130,535 | 12/1978 | Coran et al. . | |
| 5,244,996 | 9/1993 | Kawasaki et al. | 526/347 |
| 5,658,625 | 8/1997 | Bradfute et al. | 428/34.9 |

FOREIGN PATENT DOCUMENTS

| | | | |
|---|---|---|---|
| 416815 | 3/1991 | European Pat. Off. . | |
| 416815 A2 | 3/1991 | European Pat. Off. | C08F 10/00 |
| 0 572 990 A2 | 12/1993 | European Pat. Off. . | |
| 718323 | 6/1996 | European Pat. Off. . | |
| 718323 A2 | 6/1996 | European Pat. Off. | C08F 210/18 |
| 07 278 230 | 10/1995 | Japan . | |
| 7-278230 | 10/1995 | Japan . | |
| 94/06858 | 3/1994 | WIPO | C08L 23/04 |
| 95/32095 | 11/1995 | WIPO | B32B 27/32 |
| 96/07681 | 3/1996 | WIPO | C08F 212/00 |
| WO 96/07681 | 3/1996 | WIPO . | |

OTHER PUBLICATIONS

Derwent Abstract 96–075053/08 (an abstract of JP 07/330982 A published Dec. 19, 1995).
Derwent Abstract 96–225182/23(an abstract of JP 08/085440 A published Apr. 2, 1996).
Derwent Abstract 95–401001/51 (an abstract of JP 07/278230 published Oct. 24, 1995).
Dialog Information Services, file 351, Derwent WPI, Dialog accession No. 009854777, WPI No. 93–278323/35 Idemitsu Kosan Co Ltd; "Olefinic copolymer for elastomer, high tenacity material and complex materials –prepard, by copol6ymerising styrenic monomer and olefin in catalyst contg. Transition metal and organo metallic cpds., for modified copolymers mfr." JP A 5194666, 93.08.03, 9335 (Basic abstract).
English translation and Derwent Abstract of 07 278 230.

*Primary Examiner*—David W. Wu

[57] ABSTRACT

Substantially random interpolymers comprising (1) ethylene, (2) one or more aromatic vinylidene monomers or hindered aliphatic or cycloaliphatic vinylidene monomers, and (3) one or more olefinic monomers having from 3 to about 20 carbon atoms. These interpolymers find utility as film, or as sheet or as a component of a multilayered structure, as fabricated articles, as foams, fibers or emulsions and as adhesives, in adhesive formulations and in sealant compositions.

16 Claims, No Drawings

INTERPOLYMERS OF ETHYLENE, OLEFINIC MONOMERS, AND AROMATIC VINYLIDENE OR HINDERED ALIPHATIC OR CYCLOALIPHATIC VINYLIDENE MONOMERS

CROSS-REFERENCE TO RELATED APPLICATIONS

This application is a continuation-in-part of allowed application Ser. No. 08/469,828 (C-38,099-B) filed Jun. 6, 1995 now U.S. Pat. No. 5,703,187 which is a continuation of application Ser. No. 07/545,403 (C-38,099-A) filed Jul. 3, 1990 which is a continuation-in-part of application Ser. No. 07/401,345 (C-38,099) filed Aug. 31, 1989 (now abandoned).

FIELD OF THE INVENTION

The present invention pertains to interpolymers containing (1) ethylene; (2) one or more aromatic vinylidene monomers or hindered aliphatic or cycloaliphatic vinylidene monomers, and (3) one or more polymerizable $C_3$ to $C_{20}$ olefinic monomers.

FEDERALLY SPONSORED RESEARCH OR DEVELOPMENT

Not applicable.

BACKGROUND OF THE INVENTION

The generic class of materials covered by α-olefin/hindered vinylidene monomer substantially random interpolymers and including materials such as ethylene/vinyl aromatic monomer interpolymers are known in the art. For example, substantially random ethylene/styrene interpolymers, including pseudo-random interpolymers as described in EP 415815 A, offer a range of material structures and properties which makes them useful for varied applications, including the compatibilization of blends of polyethylene and polystyrene as described in U.S. Pat. No. 5,460,818. Random copolymers of aromatic vinyl monomer and an α-olefin having 4 to 12 carbon atoms are described in U.S. Pat. No. 5,244,996. Limited generic reference can be found to terpolymers of ethylene/styrene/α-olefin materials, but to date no evidence has been found which describes the effective incorporation of monomers into a copolymer, with examples in JP 07,278,230 limited to 2 mole percent or less incorporation of styrene in ethylene/α-olefin copolymers.

Although of utility in their own right, Industry is constantly seeking to further expand the applicability of these generic interpolymers, and especially those based on α-olefin/vinylidene aromatic monomers, such as ethylene/styrene interpolymers. Desired improved or superior performance characteristics to current state of the art materials can include, but are not limited to, an extended temperature range of application and low temperature performance, desirable mechanical properties and melt processability. The interpolymers of this invention provide an effective technology to address such needs.

BRIEF SUMMARY OF THE INVENTION

One aspect of the present invention pertains to interpolymers comprising (1) from about 19.5 to about 98.5 mole percent of ethylene (2) from about 0.5 to about 60 mole percent of an aromatic vinylidene monomer or a hindered aliphatic vinylidene monomer, and (3) from about 1 to about 80 mole percent of one or more $C_3$ to $C_{20}$ olefinic monomers.

In one embodiment, the interpolymers and other aspects of the present invention can comprise, consist essentially of or consist of any three such monomers enumerated herein; these interpolymers can comprise, consist essentially of or consist of the three enumerated polymerizable monomers, with the third monomer (3) being one $C_3$ to $C_{20}$ olefinic monomer.

Another aspect of the present invention pertains to such interpolymers in the form of a film, or as sheet or as a component of a multilayered structure resulting from calendering, blowing, casting or (co-)extrusion operations.

Another aspect of the present invention pertains to such interpolymers and their utility in the form of fabricated articles produced, for example, by compression molding, injection molding, blow molding, profile extrusion, or thermoforming operations.

Another aspect of the present invention pertains to such interpolymers and their utility in the form of foams, fibers or emulsions.

Another aspect of the present invention pertains to the utilization of such interpolymers in adhesives, adhesive formulations and adhesive/sealant applications.

The interpolymers of the present invention can be free of any component, compound or substituent not specifically enumerated herein when desired. Also, the present invention can be free of any component, compound or substituent even though such component, compound or substituent was originally believed to be a part of the invention.

The interpolymers of the present invention provide an improvement in one or more of the polymer properties such as, but not limited to, an extended temperature range of application and low temperature performance, desirable mechanical properties and melt processability as compared to ethylene/aromatic vinylidene monomer or hindered aliphatic or cycloaliphatic vinylidene monomer copolymers or ethylene/α-olefin monomer copolymers.

BRIEF DESCRIPTION OF THE DRAWINGS

Not applicable.

DETAILED DESCRIPTION OF THE INVENTION

The term "terpolymer" is used herein to indicate a polymer wherein three different monomers are polymerized to make the terpolymer.

The term "interpolymer is used herein to indicate a polymer wherein three or more different monomers are polymerized to make the interpolymer.

The term "substantially random" in the substantially random interpolymer comprising ethylene, one or more vinylidene aromatic monomers or hindered aliphatic vinylidene monomers, and one or more $C_3$ to $C_{20}$ olefinic monomers as used herein means that the distribution of the monomers of said interpolymer can be described by the Bernoulli statistical model or by a first or second order Markovian statistical model, as described by J. C. Randall in *POLYMER SEQUENCE DETERMINATION, Carbon*-13 *NMR Method*, Academic Press New York, 1977, pp. 71–78. Preferably, the substantially random interpolymer does not contain more than 15 percent of the total amount of vinylidene aromatic monomer in blocks of vinylidene aromatic monomer of more than 3 units. More preferably, the interpolymer is not characterized by a high degree of either isotacticity or syndiotacticity. This means that in the Carbon-13 NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The interpolymers of the present invention comprise at least three different monomers.

The interpolymers of the present invention comprise (1) from about 19.5 to about 98.5, preferably from about 25 to about 95, more preferably from about 30 to about 94 mole percent of ethylene; (2) from about 0.5 to about 60, preferably from about 1 to about 55, more preferably from about 1 to about 50 mole percent of one or more aromatic vinylidene monomers or hindered aliphatic vinylidene monomers, and (3) from about 1 to about 80, preferably from about 4 to about 65, more preferably from about 5 to about 50 mole percent of one or more $C_3$ to $C_{20}$ olefin monomers. It is to be understood that the total amount of (1), (2) and (3) is 100 mole percent.

The number average molecular weight (Mn) of the interpolymers of the present invention is usually greater than about 1,000, preferably from about 5,000 to about 1,000,000, more preferably from about 10,000 to about 500,000.

The present invention particularly concerns the following terpolymers: ethylene/styrene/propylene; ethylene/styrene/4-methyl-1-pentene; ethylene/styrene/hexene-1; ethylene/styrene/octene-1; and ethylene/styrene/norbornene.

The present invention does not encompass terpolymers of ethylene/styrene/butene-1 or ethylene/styrene/vinylbenzocyclobutene.

Suitable α-olefins, or combinations of α-olefins, which can be employed as olefinic monomer(s) (3) include for example, those containing from 3 to about 20, preferably from 3 to about 12, more preferably from 3 to about 8 carbon atoms. Suitable olefinic monomers which can be employed as olefinic monomer(s) (3) include strained ring olefins such as norbornene. Particularly suitable as olefinic monomer(s) (3) include propylene, 4-methyl-1-pentene, pentene-1, hexene-1 and octene-1. Butene-1 or vinylbenzocyclobutene can be utilized in combination with other α-olefins or olefinc monomers such as, for example, propylene, hexene-1, octene-1, or norbornene, or any other combination except for the above noted combination of ethylene/styrene/butene-1 or ethylene/styrene/vinylbenzocyclobutene.

Suitable vinylidene aromatic monomers for use as component (2) include, for example, those represented by the following formula I:

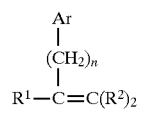

Formula I wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 6, preferably from zero to about 2, more preferably zero. Exemplary monovinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl- or phenyl-ring substituted derivatives of styrene, such as ortho-, meta-, and para-methylstyrene, the ring halogenated styrenes, para-vinyl toluene or mixtures thereof, and the like. A more preferred monovinylidene aromatic monomer is styrene.

Suitable "hindered aliphatic or cycloaliphatic vinylidene monomers" for use as components (2) include addition polymerizable vinylidene monomers corresponding to the following formula II:

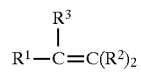

Formula II wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; and $R^3$ is a sterically bulky, aliphatic substituent of up to 20 carbons; or alternatively $R^1$ and $R^3$ together form a ring system. By the term "sterically bulky" it is meant that the monomer bearing this substituent is normally incapable of addition polymerization by standard Ziegler-Natta polymerization catalysts at a rate comparable with ethylene polymerizations. Preferred hindered aliphatic or cycloaliphatic vinylidene monomers are those in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinylidene compounds are vinyl cyclohexane and the various isomeric vinyl-ring substituted derivatives of cyclohexene and substituted cyclohexenes, and 5-ethylidene-2-norbornene. Especially suitable is vinyl cyclohexane.

The substantially random interpolymers of the present invention may be modified by typical grafting, hydrogenation, functionalizing, or other reactions well known to those skilled in the art. The polymers may be readily sulfonated or chlorinated to provide functionalized derivatives according to established techniques.

The substantially random interpolymers of the present invention can be prepared as described in U.S. application Ser. No. 545,403 filed Jul. 3, 1990 (corresponding to EP-A-0,416,815) by James C. Stevens et al., both of which are incorporated herein by reference in their entirety. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization. While preparing the substantially random interpolymers of the present invention as will be described hereinafter, an amount of atactic vinylidene aromatic homopolymer may be formed due to homopolymerization of the vinylidene aromatic monomer. The presence of vinylidene aromatic homopolymer is in general not detrimental for the purposes of the present invention and may be tolerated. The vinylidene aromatic homopolymer may be separated from the interpolymer, if desired, by extraction techniques such as selective precipitation from solution with a non-solvent for either the interpolymer or the vinylidene aromatic homopolymer. For the purpose of the present invention it is preferred that no more than 25 weight percent, preferably less than 15 weight percent based on the total weight of the interpolymers of vinylidene aromatic homopolymer is present in the interpolymer blend component.

Examples of suitable catalysts and methods for preparing the substantially random interpolymers of the present invention are disclosed in U.S. application Ser. No. 545,403, filed Jul. 3, 1990 now pending (EP-A-416,815); U.S. application Ser. No. 702,475, filed May 20, 1991 (EP-A-514,828) now abandoned; U.S. application Ser. No. 876,268, filed May 1, 1992, (EP-A-520,732) now U.S. Pat. No. 5,721,185; U.S. application Ser. No. 241,523, filed May 12, 1994 now U.S. Pat. No. 5,470,993; as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635 and 5,556,928 all of which patents and applications are incorporated herein by reference.

The substantially random interpolymers of the present invention can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Further preparative methods which may be applicable for the interpolymers of the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am.Chem.Soc.,Div. Polym. Chem.*) Volume 35, pages 686,687 [1994]) have reported copolymerization using a $TiCl_4/NdCl_3/Al(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. Sernetz et al. (*Macromol. Chem. Phys.*, v 197, pp 1071–1083, 1996) have described copolymerization of styrene with ethylene using $Me_2Si(Me_4C)$ (N-tert-butyl)$TiCl_2$/methylaluminoxane. Another suitable method includes the method disclosed for the manufacture of α-olefin/vinyl aromatic monomer interpolymers such as propylene/styrene and butene/styrene described in U.S. Pat. No. 5,244,996, assigned to Mitsui Petrochemical Industries Ltd. All of the above are incorporated herein by reference.

Additives such as antioxidants (e.g., hindered phenols such as, for example, IRGANOX® 1010), phosphites (e.g., IRGAFOS® 168)), U.V. stabilizers, cling additives (e.g., polyisobutylene ), antiblock additives, colorants, pigments, fillers, and the like can also be included in the interpolymers of the present invention, to the extent that they do not interfere with the enhanced properties discovered by Applicants.

The additives are employed in functionally equivalent amounts known to those skilled in the art. For example, the amount of antioxidant employed is that amount which prevents the polymer from undergoing oxidation at the temperatures and environment employed during storage and ultimate use of the polymers. Such amounts of antioxidants is usually in the range of from about 0.01 to about 10, preferably from about 0.05 to about 5, more preferably from about 0.1 to about 2 percent by weight based upon the weight of the polymer.

Similarly, the amounts of any of the other enumerated additives are the functionally equivalent amounts such as the amount to render the polymer antiblocking, to produce the desired amount of filler loading to produce the desired result, to provide the desired color from the colorant or pigment. Such additives can suitably be employed in the range of from about 0.05 to about 50, preferably from about 0.1 to about 35 more preferably from about 0.2 to about 20 percent by weight based upon the weight of the polymer. However, in the instance of fillers, they could be employed up to about 90 percent by weight based on the weight of the polymer.

The interpolymers of the present invention can be utilized to produce a wide range of fabricated articles such as, for example but not limited to, films, sheets or as a components of a multilayered structure resulting from calendering, blowing, casting or (co-)extrusion operations.

The interpolymers can find utility in the form of fabricated articles produced, for example, by compression molding, injection molding, blow molding, profile extrusion, or thermoforming operations.

The interpolymers can also be used in the manufacture of fibers, foams and latices. The interpolymers of the present invention can also be utilized in adhesives, adhesive formulations and adhesive/sealant applications.

The following examples are illustrative of the invention, but are not to be construed as to limiting the scope of the invention in any manner.

EXAMPLES 1–10

ESP and ESO Preparation details

Manipulations of catalyst and cocatalyst were carried out in an inert atmosphere glove box. The catalyst and cocatalyst used were [($\eta^5$-$C_5Me_4$)$Me_2SiNtBu$] $TiMe_2$, and $B(C_6F_5)_3$, respectively.

Isopar™ E (Exxon), octene-1 and styrene were purified by sparging with purified nitrogen followed by passage through columns containing $A_2$ alumina and $Q_5$ reactant at 50 psig (345 kPa) using a purified nitrogen pad. All transfers of solvents and solutions described below were accomplished using a gaseous pad of dry, purified nitrogen. Gaseous feeds to the reactor were purified by passage through columns of A-204 alumina and $Q_5$ reactant. Alumina was previously activated at 375° C. with nitrogen and $Q_5$ reactant was activated at 275° C. with 5% hydrogen in nitrogen.

Batch reactor polymerizations were conducted in a two liter Parr reactor with an electrical heating jacket, internal serpentine coil for cooling, and a bottom drain valve.

Pressures, temperatures and block valves were computer monitored and controlled. Isopar™ E, octene-1 (if used) and styrene were measured in a solvent shot tank fitted with a differential pressure transducer. These were then added to the reactor from the solvent shot tank. The contents of the reactor was stirred at 1200 rpm. Propylene monomer (if used) was then added to the reactor using a Sierra Instruments 830 mass flow meter and totalizer. Hydrogen, if used, was added by differential expansion from a 75 ml shot tank initially at 700 psig (4,826 kPa). The contents of the reactor was then heated to the desired run temperature under 475 psig (3,275 kPa) of ethylene pressure. The catalyst and cocatalyst (both as 0.00500M solution in Isopar™ E) were combined in a one to one molar ratio in the glove box and transferred from the glove box to the catalyst shot tank through 1/16 in (0.16 cm) tubing using 8 ml of Isopar™ E to aid in the transfer. The catalyst tank was then pressurized to 700 psig (4,826 kPa) using nitrogen. After the contents of the reactor had stabilized at the desired run temperature, the catalyst was injected into the reactor via a dip tube. The temperature was maintained by allowing cold water to pass through the internal cooling coils. The start of polymerization was frequently accompanied by a brief temperature excursion due to the polymerization exotherm. The reaction was allowed to proceed for the desired time with ethylene provided on demand. The contents of the reactor were then expelled into a 4 liter nitrogen purged vessel and quenched with iso-propyl alcohol and 100 mg of Irganox™ 1010 was added as an antioxidant. The reactor was then washed with 1200 ml of solvent at 150° C. prior to the next run. Volatiles were removed from the polymers in a vacuum oven at 115° C. overnight and cooled to 50° C. prior to removal from the oven.

Isopar™ E is a mixture of $C_{8-10}$ saturated hydrocarbons commercially available from Exxon Chemical Company.

Irganox™ 1010 is a hindered phenolic antioxidant commercially available from Ciba Geigy Ltd.

Sample Characterization and Testing

Monomer contents of the interpolymers and the atactic polystyrene content were determined for the interpolymers using $^1$H NMR spectroscopy and are expressed in terms of both wt % and mol %.

Molecular Weight determinations, Gel Permeation Chromatography (GPC): For Examples 1 to 10, samples were dissolved in trichlorobenzene (TCB) and run at 140° C. using TCB as the mobile phase to determine their MW and MWD. For Examples 11 to 18, samples were dissolved in TCB at 160° C. and run at room temperature in a GPC (tetrahydrofuran as the mobile phase) equipped with differential refractive index and ultra-violet detectors. Molecular weights were derived using a polystyrene standard calibration curve.

Differential Scanning Calorimetry (DSC): A Dupont DSC-2920 was used to measure the thermal transition temperatures and heat of transition for the samples. In order to eliminate previous thermal history, samples were first heated to 200° C. Heating and cooling curves were recorded at 10° C./min. Melting (Tm; from second heat) and crystallization (Tc) temperatures were recorded from the peak temperatures of the endotherm and exotherm, respectively.

Sample preparation, Mechanical testing; Compression Molding: Samples were melted at 190° C. for 3 minutes and compression molded at 190° C. under 20,000 lb. of pressure for another 2 minutes. Subsequently, the molten materials were quenched in a press equilibrated at room temperature.

Dynamic Mechanical Spectroscopy (DMS): Dynamic mechanical properties of compression molded samples were monitored using a Rheometrics 800E mechanical spectrometer. Samples were run in torsional rectangular geometry and purged under nitrogen to prevent thermal degradation. Generally, test part were cooled to −100° C. and a strain of 0.05% was applied. Oscillation frequency was fixed at 10 rad/sec and the temperature was ramped at 5° C. increments.

Shear Rheology: Oscillatory melt shear rheology measurements were performed on Examples 11 to 18 with a Rheometrics RMS-800 rheometer. Rheological properties were monitored at an isothermal set temperature of 190° C. in a frequency sweep mode.

Mechanical Testing. Shore A hardness was measured at 23° C. based on ASTM-D240. Tensile properties of the compression molded samples were measured using an Instron 1145 tensile machine. ASTM-D638 (microtensile) samples were tested at a crosshead speed of 5 in/min. The average of four tensile measurements is reported. Fb, tensile energy at break, is the area under the tensile stress/strain curve.

Tensile Stress Relaxation: Uniaxial tensile stress relaxation was evaluated using an Instron 1145 tensile machine. Compression molded film (~20 mil thick) with a 2.54 cm (1 inch) gauge length was deformed to a strain level of 50% at a strain rate of 20 $min^{-1}$. The force required to maintain 50% elongation was monitored for 10 min. The magnitude of the stress relaxation is defined as $[(f_i-f_f)/f_i)]$ where $f_i$ is the initial force and $f_f$ is the final force.

Specific details for the preparation of ethylene/styrene/propylene (ESP) interpolymers, examples 1 to 7, and ethylene/styrene/octene-1 (ESO) interpolymers, examples 8 to 10, are compiled in Table 1.

TABLE 1

Preparation of Ethylene/styrene/α-Olefin Terpolymers

| Ex. | Isopar™ E (ml) | 1-Octene (ml) | Styrene (ml) | Propylene (g) | $H_2$ delta psi (kPa) | Temp. (°C.) | Time (min) | Catalyst µmol | Exotherm (°C.) | Yield (g) |
|---|---|---|---|---|---|---|---|---|---|---|
| 1 | 879 | 0 | 121 | 70 | 0 | 82 | 10 | 1.25 | 14 | 57.3 |
| 2 | 671 | 0 | 329 | 70 | 0 | 118 | 10 | 3.75 | 8 | 31.4 |
| 3 | 671 | 0 | 329 | 130 | 0 | 82 | 10 | 1.25 | 15 | 73.4 |
| 4 | 879 | 0 | 121 | 70 | 0 | 118 | 10 | 2.50 | 8 | 42.2 |
| 5 | 775 | 0 | 225 | 150 | 0 | 100 | 10 | 1.50 | 6 | 53.7 |
| 6 | 775 | 0 | 225 | 100 | 0 | 100 | 10 | 1.25 | 6 | 46.6 |
| 7 | 775 | 0 | 225 | 100 | 0 | 70 | 10 | 0.75 | 31 | 64.9 |
| 8 | 850 | 253 | 101 | 0 | 11 | 100 | 15 | 1.00 | 8 | 84.3 |
| 9 | 923 | 175 | 101 | 0 | 11 | 100 | 15 | 0.75 | 6 | 80.2 |

TABLE 1-continued

Preparation of Ethylene/styrene/α-Olefin Terpolymers

| Ex. | Isopar ™ E (ml) | 1-Octene (ml) | Styrene (ml) | Propylene (g) | $H_2$ delta psi (kPa) | Temp. (°C.) | Time (min) | Catalyst μmol | Exotherm (°C.) | Yield (g) |
|---|---|---|---|---|---|---|---|---|---|---|
| 10 | 758 | 253 | 204 | 0 | 11 (76) | 100 | 15 | 1.00 | 9 | 61.4 |

The polymer properties are provided in the following table 2.

TABLE 2

Properties of E/S/α-Olefin Terpolymers

| | Ethylene | | Propylene or Octene | | Styrene | | | | |
|---|---|---|---|---|---|---|---|---|---|
| Ex. | Wt. % | Mol. % | Wt. % | Mol. % | Wt. % | Mol. % | $M_n*10^{-3}$ | $M_w/M_n$ | Tg °C. |
| 1 | 60.5 | 72.2 | 33.1 | 25.7 | 6.4 | 2.1 | 107.9 | 2.22 | −40.4 |
| 2 | 59.1 | 72.5 | 30 | 24.0 | 10.8 | 3.6 | 22.8 | 2.6 | −36.6 |
| 3 | 45.8 | 59.9 | 42 | 35.8 | 12.2 | 4.3 | 83.4 | 2.02 | −38.9 |
| 4 | 65.5 | 76.0 | 29.7 | 22.5 | 4.8 | 1.5 | 26.8 | 2.26 | −39 |
| 5 | 40.8 | 53.8 | 50 | 42.9 | 9.2 | 3.3 | 40.3 | 2.17 | −36.6 |
| 6 | 51.1 | 64.4 | 39.6 | 32.5 | 9.3 | 3.2 | 43.6 | 2.43 | ND[n] |
| 7 | 57.4 | 70.1 | 34.1 | 27.1 | 8.5 | 2.8 | 95.2 | 2.57 | −38.9 |
| 8 | 71.7 | 88.7 | 25.3 | 10.3 | 3 | 1.0 | 26.2 | 2.38 | −29.8 |
| 9 | 78.7 | 92.0 | 18.5 | 7.1 | 2.8 | 0.9 | 31.7 | 2.36 | −17.7 |
| 10 | 74.1 | 90.0 | 21 | 8.4 | 4.9 | 1.6 | 25.8 | 2.35 | −21.5 |

| | $Tm^a$ | $\Delta H_f^b$ | $Tc^c$ | Shore A Hardness | $E^d$ | | $\epsilon_b^e$ | $\sigma_b^f$ | | $E_b^g$ | |
|---|---|---|---|---|---|---|---|---|---|---|---|
| Ex. | °C. | J/g | °C. | 1 sec/5 sec | psi | kPa | % | psi | kPa | in-lb | kg-cm |
| 1 | 3.6 | 21.1 | 3.2 | 52/47 | 310 | 2,137 | 3222 | 554 | 3,820 | 130.3 | 150.1 |
| 2 | 5.4 | 20 | 6.7 | 40/31 | 200 | 1,379 | 768 | 36 | 248 | 3.7 | 4.3 |
| 3 | — | — | — | 61/41 | 370 | 2,551 | 190 | 72 | 496 | 2.1 | 2.4 |
| 4 | −12.9 | 11.6 | −9.1 | 46/39 | 340 | 2,344 | 732 | 86 | 593 | 6.9 | 7.9 |
| 5 | 6.6 | 25.1 | 7.9 | 37/30 | 230 | 1,586 | 497 | 9 | 62 | 1.2 | 1.4 |
| 6 | −20.2 | 3.7 | −27.9 | 42/28 | 290 | 1,999 | 287 | 24 | 165 | 1.4 | 1.6 |
| 7 | −16.5 | 6.5 | −20.1 | 53/47 | 330 | 2,275 | >4000 | 125 | 862 | 60.4 | 69.6 |
| 8 | 84.6 | 95.8 | 64 | 86 | 4,070 | 28,062 | 1,048 | 3,729 | 25,711 | 198.7 | 228.9 |
| 9 | 84 | 91.5 | 62.3 | 87 | 6,430 | 44,333 | 8,87 | 4,336 | 29,896 | 212.7 | 245.0 |
| 10 | 87.3 | 97.2 | 68.2 | 87 | 4,770 | 32,888 | 1,066 | 4,298 | 29,634 | 228.7 | 263.5 |

[a]Tm is melting point.
[b]$\Delta H_f$ is heat of fusion.
[c]Tc is crystallization point
[d]E is tensile modulus.
[e]$\epsilon_b$ is strain at break.
[f]$\sigma_b$ is stress at break.
[g]$E_b$ is energy at break.
[h]ND is not determined.

EXAMPLES 11 TO 18

Ethylene/Styrene/Propylene Interpolymer Preparation

Ethylbenzene solvent was supplied at 30 psig (207 kPa). The feed to the reactor was measured by a Micro-Motion mass flow meter. A variable speed diaphragm pump controlled the feed rate. At the discharge of the solvent pump a side stream was taken to provide flush flows for the catalyst injection line (1 lb/hr (0.45 kg/hr)) and the reactor agitator (0.75 lb/hr ( 0.34 kg/hr)). These flows were measured by differential pressure flow meters and controlled by manual adjustment of micro-flow needle valves. The propylene was supplied at 600 psig (4,137 kPa). It was measured by a Micro-Motion mass flow meter and flow was controlled by a Research control valve. Uninhibited styrene monomer was supplied at 30 psig (207 kpa). The feed to the reactor was measured by a Micro-Motion mass flow meter. A variable speed diaphragm pump controlled the feed rate. The propylene and styrene streams were mixed with the remaining solvent stream. Ethylene was supplied at 600 psig (4,137 kPa). The ethylene stream was measured by a Micro-Motion mass flow meter just prior to the Research valve controlling flow. Three Brooks flow meter/controllers (1–200 sccm and 2–100 sccm) were used to deliver hydrogen into the ethylene stream at the outlet of the ethylene control valve. The ethylene/hydrogen mixture combines with the solvent/propylene/styrene stream at ambient temperature. The temperature of the solvent/monomer as it enters the reactor was dropped to ~5° C. by an exchanger with −5° C. glycol on the jacket. This stream entered the bottom of the reactor. The three component catalyst system and its solvent flush also enter the reactor at the bottom but through a different port than the monomer stream. The catalyst components for examples 11, 12,13 and 14 were: [(h5-$C_5Me_4$)$Me_2$SiN(tBu] Ti($CH_2$=CH—CH=CHMe), fluoroarylborane, B($C_6F_5$)$_3$ and mixed alkyl aluminoxane (M-MAO). The catalyst components for examples 15, 16,17 and 18 were: [(h5-$C_5Me_4$) $Me_2$SiN(tBu]Ti($CH_2$=CH—CH=CHMe), methyl dialkyl (alkyl=armeen: $C_{14}$–$C_{18}$ mixed alkyl $C_nH_{2n+1}$) ammonium salt of tetrakis pentafluoroaryl borate and diisobutyl aluminum phenoxide derived from 2,6-di-tert butyl, 4-methyl phenoxide. Dilution of the catalyst components takes place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

The single reactor used was either a 1 gallon (3.8 L) or a 6 gallon (22.7 L), oil jacketed, Autoclave continuously stirred tank reactor (CSTR). A magnetically coupled agitator with Lightning A-320 impellers provides the mixing. The reactor runs liquid full at 475 psig (3,275 kPa). Process flow was in the bottom and out the top. A heat transfer oil was circulated through the jacket of the reactor to remove some of the heat of reaction. After the exit from the reactor was a micromotion flow meter that measures flow and solution density. All lines on the exit of the reactor were traced with 50# steam and insulated.

Polymerization was stopped with the addition of catalyst kill (water) mixed with ethylbenzene solvent into the reactor product line after the micromotion flow meter measuring the solution density. Other polymer additives can be added with the catalyst kill. A static mixer in the line provides dispersion of the catalyst kill and additives in the reactor effluent stream. This stream next enters post reactor heaters that provide additional energy for the solvent removal flash. This flash occurs as the effluent exits the post reactor heater and the pressure was dropped from 475 psig (3,275 kPa) down to ~250 mm of pressure absolute at the reactor pressure control valve. This flashed polymer entered a hot oil jacketed devolatilizer. Approximately 85 percent of the volatiles were removed from the polymer in the devolatilizer. The volatiles exit the top of the devolatilizer. The stream was condensed and with a glycol jacketed exchanger, enters the suction of a vacuum pump and was discharged to a glycol jacket solvent and styrene/ethylene and propylene separation vessel. Solvent and styrene were removed from the bottom of the vessel and ethylene and propylene vent from the top. The ethylene/propylene stream was measured with a Micro-Motion mass flow meter and analyzed for composition. The measurement of vented ethylene plus a calculation of the dissolved gasses in the solvent/styrene stream were used to calculate the ethylene conversion. The polymer seperated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

TABLE 3

Preparation conditions for Interpolymer Examples 11 to 18

| Ex. | Solvent Flow Lb/Hr (kg/Hr) | Ethylene Flow Lb/Hr (kg/Hr) | Propylene Flow Lb/Hr (kg/Hr) | Styrene Flow Lb/Hr (kg/Hr) | Hydrogen Flow Sccm | Top Temp °C. | Vent Conv. % | Ethylene In polymer* Wt. % | Styrene In polymer* Wt. % | Propylene In polymer* Wt. % |
|---|---|---|---|---|---|---|---|---|---|---|
| 11 | 14.01 (96.6) | 1.20 (8.27) | 1.20 (8.27) | 5.00 (34.47) | 18.00 | 69.00 | 87.66 | 38.3 | 28.3 | 33.4 |
| 12 | 11.06 (76.26) | 1.19 (8.20) | 0.8 (5.65) | 8.00 (55.16) | 19.00 | 61.40 | 85.38 | 40.5 | 36.3 | 23.2 |
| 13 | 7.23 (49.85) | 1.20 (8.27) | 0.41 (2.83) | 12.00 (82.74) | 16.00 | 60.70 | 77.60 | 41.3 | 46.0 | 12.7 |
| 14 | 18.29 (126.11) | 1.81 (12.48) | 1.78 (12.27) | 8.00 (55.16) | 20.00 | 87.20 | 87.68 | 34.5 | 23.9 | 41.6 |
| 15 | 15.91 (109.70) | 1.19 (8.20) | 0.21 (1.45) | 12.00 (82.74) | 4.00 | 81.50 | 82.88 | 38.9 | 53.5 | 7.6 |
| 16 | 19.03 (131.21) | 1.19 (8.20) | 0.20 (1.38) | 15.00 (103.42) | 8.00 | 67.60 | 82.22 | 34.6 | 59.2 | 6.2 |
| 17 | 18.57 (128.04) | 1.21 (8.34) | 0.18 (1.24) | 15.00 (103.42) | 8.00 | 63.80 | 83.34 | 27.4 | 67.5 | 5.1 |
| 18 | 19.06 (131.41) | 1.20 (8.27) | 0.21 (1.45) | 15.00 (103.42) | 8.00 | 67.30 | 81.78 | 30.8 | 63.6 | 5.6 |

*Determined by $^1$H N.M.R.

Preparation of ethylene/styrene Interpolymers (A), (B), (C). (Not examples of the present invention.)

Polymer was prepared in a 400 gallon agitated semi-continuous batch reactor. The reaction mixture consisted of approximately 250 gallons of a solvent comprising a mixture of cyclohexane (85wt %) & isopentane (15wt %), and styrene. Prior to addition, solvent, styrene and ethylene are purified to remove water and oxygen. The inhibitor in the styrene is also removed. Inerts are removed by purging the vessel with ethylene. The vessel is then pressure controlled to a set point with ethylene. Hydrogen is added to control molecular weight. Temperature in the vessel is controlled to set-point by varying the jacket water temperature on the vessel. Prior to polymerization, the vessel is heated to the desired run temperature and the catalyst components: Titanium: (N-1,1-dimethyl-ethyl)dimethyl(1-(1,2,3,4,5-eta)-2,3, 4,5-tetramethyl-2,4-cyclopentadien-1-yl)silanaminato))(2-) N)-dimethyl, CAS# 135072-62-7; Tris(pentafluorophenyl) boron, CAS# 001109-15-5; modified methylaluminoxane Type 3A, CAS#146905-79-5, are flow controlled, on a mole ratio basis of 1/3/5 respectively combined and added to the vessel. After starting, the polymerization is allowed to proceed with ethylene supplied to the reactor as required to maintain vessel pressure. In some cases, hydrogen is added to the headspace of the reactor to maintain a mole ratio with respect to the ethylene concentration. At the end of the run, the catalyst flow is stopped, ethylene is removed from the reactor, about 1000 ppm of Irganox™1010 anti-oxidant is then added to the solution and the polymer is isolated from the solution. The resulting polymers are isolated from solution by either stripping with steam in a vessel or by use of a devolatilizing extruder. In the case of the steam stripped material, additional processing is required in extruder-like equipment to reduce residual moisture and any unreacted styrene. Specific conditions for the preparation of the interpolymers are given in Table 4.

TABLE 4

| Sample | Solvent loaded lbs | Solvent loaded kg | Styrene loaded lbs | Styrene loaded kg | Pressure Psig | Pressure kPa | Temp °C. | Total $H_2$ Added Grams | Run Time Hours | Polymer in Solution Wt. % | Melt Index | Total Wt % Styrene in Polymer* | Talc Level Wt. % | Isolation Method |
|---|---|---|---|---|---|---|---|---|---|---|---|---|---|---|
| (A) | 842 | 382 | 662 | 300 | 105 | 724 | 60 | 8.8 | 3.7 | 8.6 | 0.03 | 29.8 | 0 | Extruder |
| (B) | 839 | 381 | 661 | 300 | 105 | 724 | 60 | 53.1 | 4.8 | 11.6 | 2.6 | 45.5 | 0 | Extruder |
| (C) | 252 | 114 | 1320 | 599 | 40 | 276 | 60 | 23 | 6.5 | 18.0 | 1.8 | 81.6 | <2.0 | Steam Stripped |

*Measured by Fourier transform infrared spectroscopy (FTIR), numbers may be different to NMR values in Table 5.

Table 5 contains composition, molecular weight and glass transition data for Interpolymer Examples 11 to 18 and Comparative Experiments A, B and C.

Table 6 contains tensile and melt rheological properties of Interpolymer Examples 11 to 18 and Comparative Experiments A, B and C.

TABLE 5

Composition, molecular weight and glass transition data.

| Ex. | wt % aPS[a] (NMR) | Ethylene Percent (NMR) wt. | Ethylene Percent (NMR) mole | Propylene Percent (NMR) wt. | Propylene Percent (NMR) mole | Styrene Percent wt. | Styrene Percent mole | Mn × 10$^{-3}$ | Mw × 10$^{-3}$ | Mw/Mn | Tg (DSC)[b] °C. | Tg (tan δ)[c] °C. |
|---|---|---|---|---|---|---|---|---|---|---|---|---|
| 11 | 2.1 | 38.3 | 50.3 | 33.4 | 39.6 | 28.3 | 10 | 43 | 225.1 | 5.2 | ND[d] | −25.0 |
| 12 | 9.3 | 40.5 | 56.8 | 23.3 | 29.5 | 36.3 | 13.7 | 37 | 218.6 | 5.9 | ND[d] | −18.0 |
| 13 | 26.6 | 41.3 | 63.4 | 12.7 | 17.6 | 46.1 | 19 | 42.2 | 235.8 | 5.6 | ND[d] | −8.0 |
| 14 | 1.7 | 34.5 | 43.9 | 41.6 | 47.9 | 23.9 | 8.2 | 65 | 137.1 | 2.1 | −30.7 | −22.9 |
| 15 | 10.3 | 38.9 | 64.7 | 7.6 | 11.4 | 53.5 | 23.9 | 90.6 | 193.2 | 2.1 | −8.2 | 3.0 |
| 16 | 7.8 | 34.6 | 61.6 | 6.2 | 10.0 | 59.2 | 28.4 | 114.1 | 237.5 | 2.1 | 0.1 | 10.8 |
| 17 | 5.3 | 27.4 | 54.6 | 5.1 | 9.2 | 67.5 | 36.2 | 96.8 | 210.6 | 2.2 | 14.6 | 25.3 |
| 18 | 6.3 | 30.8 | 58.1 | 5.6 | 9.5 | 63.6 | 32.3 | 91.7 | 201.5 | 2.2 | 4.6 | 15.4 |
| A* | 1.2 | 72.7 | 90.8 | — | — | 27.3 | 9.8 | 118.1 | | 2.04 | −17.2 | −7.9 |
| B* | 10.3 | 56.6 | 82.9 | — | — | 43.4 | 17.1 | 66.8 | | 1.89 | −15.0 | −4.3 |
| C* | 7.8 | 27.3 | 58.2 | — | — | 72.7 | 41.8 | 71 | | 2.63 | 24.7 | 30 |

*Not an example of the present invention
[a]Atactic polystyrene.
[b]Tg (DSC) Tg from differential scanning calorimetry
[c]Tg (tanδ): Tg from tan δ maximum
[d]Not determined.

TABLE 6

Tensile and melt rheological properties of Interpolymer Examples 11 to 18

| Ex. | Shore A Hardness 1 sec/ 5 sec | E[a], psi | E[a], MPa | ε$_b$[b] % | σ$_b$[c] psi | σ$_b$[c] MPa | E$_b$[d] in-lb | E$_b$[d] N.m | Stress Relax.[e] % | η(0.1)[f] poise ×10$^{-3}$ | tan δ η(100/0.1)[g] | (0.1) |
|---|---|---|---|---|---|---|---|---|---|---|---|---|
| 11 | 47/39 | 194 | 1.3 | 313 | 28 | 0.19 | 2 | 2.7 | 89 | 6.1 | 0.17 | 11.8 |

TABLE 6-continued

Tensile and melt rheological properties of Interpolymer Examples 11 to 18

| Ex. | Shore A Hardness 1 sec/ 5 sec | $E^a$, psi | MPa | $\epsilon_b{}^b$ % | $\sigma_b{}^c$ psi | MPa | $E_b{}^d$ in-lb | N.m | Stress Relax.$^e$ % | $\eta(0.1)^f$ poise ×10$^{-3}$ | $\eta(100/0.1)^g$ | tan δ (0.1) |
|---|---|---|---|---|---|---|---|---|---|---|---|---|
| 12 | 53/44 | 276 | 1.9 | 310 | 33 | 0.23 | 2 | 2.7 | 94 | 8.3 | 0.13 | 6.9 |
| 13 | 69/64 | 650 | 4.5 | 1,700 | 28 | 0.19 | 16 | 21.7 | 92 | 1.8 | 0.07 | 2.5 |
| 14 | 34/23 | 141 | 1.0 | 126 | 8 | 0.06 | 0.3 | 0.4 | cbm$^h$ | 3.0 | 0.37 | 29.0 |
| 15 | 62/56 | 432 | 3.0 | 367 | 51 | 0.35 | 6 | 8.1 | 86 | 2.1 | 0.35 | 22.9 |
| 16 | 65/61 | 413 | 2.8 | >1,000 | 228 | 1.57 | 34 | 46.1 | 72 | 3.0 | 0.31 | 22.0 |
| 17 | 86/76 | 3675 | 25.3 | 351 | 2,993 | 20.64 | 55 | 74.6 | 82 | 1.9 | 0.37 | 35.9 |
| 18 | 71/64 | 569 | 3.9 | 469 | 673 | 4.64 | 29 | 39.3 | 71 | 2.4 | 0.33 | 24.9 |
| A* | 88 | 2,900 | 20.0 | 377.5 | 4,974 | 34.29 | 107.3 | 145.5 | 30.2 | 16.6 | cbm$^h$ | 2.37 |
| B* | 75 | 950 | 6.6 | 475 | 3,258 | 22.46 | 75.4 | 102.2 | 38 | 1.05 | 0.15 | 4.2 |
| C* | 98 | 10,200 | 70.3 | 248 | 2,467 | 17.01 | 72.4 | 98.2 | 94 | 1.01 | 0.14 | 9.98 |

*Not an example of the present invention.
$^a$E = tensile modulus
$^b\epsilon_b$ = strain at break
$^c\sigma_b$ = stress at break
$^dE_b$ = tensile energy at break
$^e$Stress Relax. = tensile stress relaxation measured at 50% strain & 10 min.
$^f\eta(0.1)$ = the viscosity at 0.1 rad/sec.
$^g\eta(100/0.1)$ = the ratio of viscosities at 100 and 0.1 rad/sec.
$^h$cbm = cannot be measured.

The above example clearly demonstrate that particularly desirable balances of properties can be found in the interpolymers of the present invention, and relate to the selective variation of comonomer molar ratios, and the catalyst and polymerization technology of this invention.

For comparison purposes, refer to A, B and C in tables 5 and 6 which are copolymers of ethylene and styrene.

Table 2, Examples 1 to 7, show that variation in comonomer contents and molecular weight can give ethylene/styrene/propylene interpolymers with low Tg, and hence a broader range of applicability. The mechanical properties show good elongation at break, yet are very soft materials. These interpolymers find applicability in, for example, hot melt and pressure sensitive adhesive formulations, because of the balance of mechanical properties and compatibility with other components.

Tables 5 and 6, Examples 11 to 18 further show the breadth of the technology for ethylene/styrene/propylene interpolymers. The interpolymers have good mechanical integrity, from the stress/strain data. The interpolymers show high stress relaxation behavior, which translates to functional properties in film and sheet materials such as dead fold. The melt theological properties show how variation of comonomer content can be utilized to achieve melt processability characteristics.

What is claimed is:

1. A substantially random interpolymer resulting from polymerizing
   (1) from about 19.5 to about 98.5 mole percent of ethylene;
   (2) from about 0.5 to about 60 mole percent of one or more aromatic vinylidene monomers or hindered aliphatic or cycloaliphatic vinylidene monomers; and
   (3) from about 1 to about 80 mole percent of one or more olefinic monomers having from 3 to about 20 carbon atoms.

2. A substantially random interpolymer of claim 1 wherein
   component (1) comprises from about 25 to about 95 mole percent of ethylene;
   component (2) comprises from about 1 to about 55 mole percent of one or more aromatic vinylidene monomers or hindered aliphatic or cycloaliphatic vinylidene monomers; and
   component (3) comprises from about 4 to about 65 mole percent of one or more olefinic monomers having from 3 to about 20 carbon atoms.

3. A substantially random interpolymer of claim 1 wherein
   component (1) comprises from about 30 to about 94 mole percent of ethylene;
   component(2) comprises from about 1 to about 50 mole percent of one or more aromatic vinylidene monomers; and
   component (3) comprises from about 5 to about 50 mole percent of one or more olefinic monomers having from 3 to about 20 carbon atoms.

4. An interpolymer of claim 1 which is a terpolymer wherein
   component (2) is a vinyl aromatic monomer; and
   component (3) is an α-olefin having from 3 to about 12 carbon atoms.

5. An interpolymer of claim 1 wherein
   component (2) is styrene; and
   component (3) is one or more olefinic monomers selected from the group consisting of propylene, butene-1,4-methyl-1-pentene, pentene-1, hexene-1, octene-1 and norbornene;
with the proviso that component (3) cannot be butene-1 alone.

6. An interpolymer of claim 2 which is a terpolymer wherein
   component (2) is a vinyl aromatic monomer; and
   component (3) is an olefinic monomer having from 3 to about 12 carbon atoms.

7. An interpolymer of claim 1 which is a terpolymer wherein
   component (2) is styrene; and
   component (3) is propylene, hexene-1, octene-1 or norbornene.

8. An interpolymer of claim 2 which is a terpolymer wherein component (2) is styrene; and component (3) is an α-olefin having from 3 to about 8 carbon atoms.

9. An interpolymer of claim 2 which is a terpolymer wherein component (2) is styrene; and component (3) is propylene, 4-methyl-1-pentene, pentene-1, hexene-1, octene-1 or norbornene.

10. An interpolymer of claim 2 which is a terpolymer wherein component (2) is styrene; and component (3) is propylene.

11. An interpolymer of claim 2 which is a terpolymer wherein component (2) is styrene; and component (3) is octene-1.

12. An expandable composition comprising (A) at least one blowing agent; and (B) at least one interpolymer of claim 1.

13. One or more interpolymers of claim 1 in the form of a film, sheet or as a component of a multilayered structure resulting from calendering, blowing, casting, or (co-) extrusion operations.

14. One or more interpolymers of claim 1 in the form of fabricated articles produced by compression molding, injection molding, blow molding, profile extrusion, or thermoforming operations.

15. One or more interpolymers of claim 1 in the form of a foam, fiber or emulsion.

16. One or more interpolymers of claim 1 in the form of an adhesive, adhesive formulation or sealant composition.

* * * * *